INVENTORS
Mario R. Paglee
Robert W. Capron

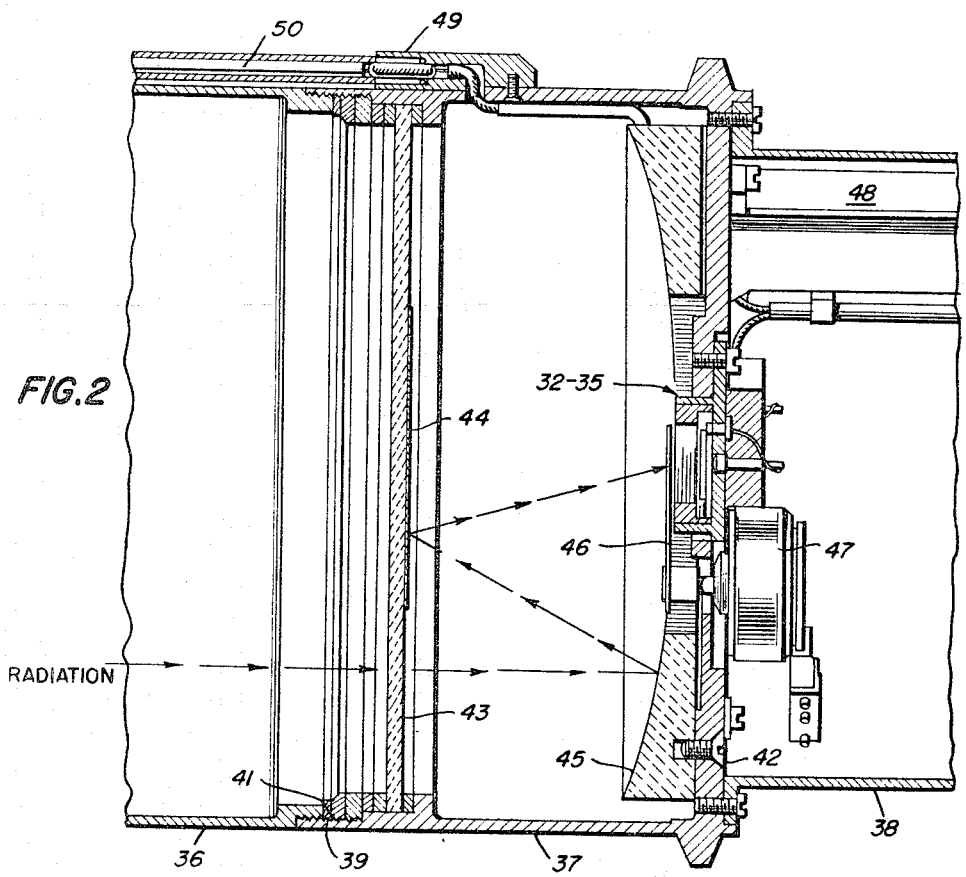
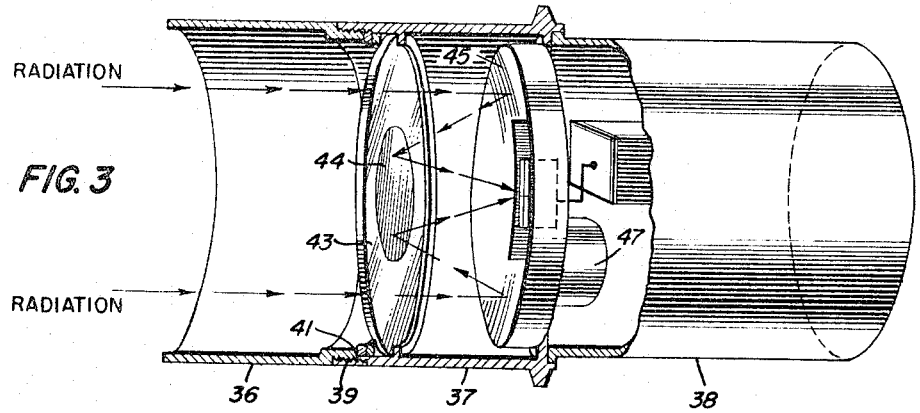

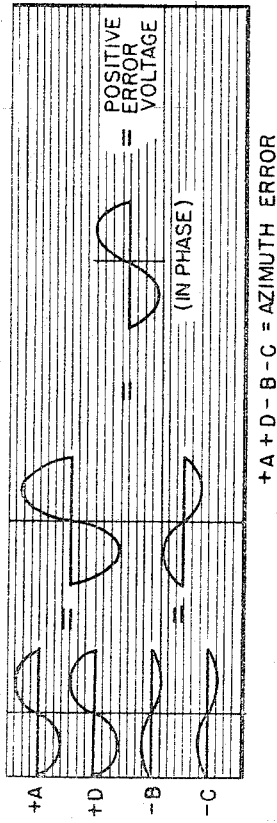
FIG. 5b
FIG. 5a
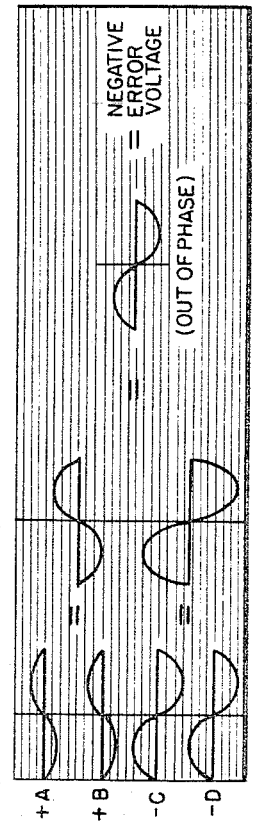
FIG. 6b
FIG. 6a

United States Patent Office 3,320,420
Patented May 16, 1967

3,320,420
INFRARED DETECTION SYSTEM FOR USE IN EARLY STAGES OF MISSILE LAUNCHING
Mario R. Paglee, Moorestown, and Robert W. Capron, Pennsauken, N.J., assignors, by mesne assignments, to the United States of America as represented by the Secretary of the Navy
Filed Mar. 26, 1964, Ser. No. 355,134
3 Claims. (Cl. 250—83.3)

ABSTRACT OF THE DISCLOSURE

An infrared detection system for use in the early stages of a missile launching where there is rapid angular position changes. An error signal is generated which is impressed on a radar or other associated tracking system and the infrared detector is then turned off.

The present invention relates to infrared tracking systems and more particularly to infrared tracking systems for use during missile launchings.

In the early phases of a missile launching, rapid movement of the missile necessitates large and rapid angular positional changes in tracking apparatus, such as a radar antenna, located in close proximity to the launching pad. Additionally, ground clutter creates a problem that makes it very difficult, if not impossible, to skin track a missile. A small delay in response of the antenna, particularly in elevation, may cause complete loss of the missile by the tracker.

The infra-red tracking system of the present invention provides error information to the prime tracking system which forces the control system of the tracker to follow the motion of the missile. Such an infra-red system may be used either in conjunction with preprogramming devices which provide a course forcing function to the tracker, based upon the aerodynamic factors of an ideal missile flight; the infra-red system providing a fine tracking function, or the infra-red system used alone providing the only tracking forcing function.

An object of the present invention is to provide a method for tracking a missile during launch through ground clutter.

A further object of the invention is to provide a method for tracking a missile during launch while large elevation changes are prevalent.

Still another object is to provide a method for forcing radar antenna control circuits to track on a missile during launch.

Yet another object is to provide a method for fine changes in antenna forcing functions in a missile tracking system during the early launch phase.

Other objects, advantages and novel features of the invention will become apparent from the following detailed description of the invention when considered in conjunction with the accompanying drawings wherein:

FIG. 2 is a cross-sectional view of an embodiment of the tracker head of the invention;

FIG. 3 is a diagrammatic view of the path of radiation within the tracking head;

FIGS. 5a, 5b, and 6a, 6b are diagrams illustrative of the radiation patterns on the tracking detector and the electrical signals produced thereby.

Figure 1:
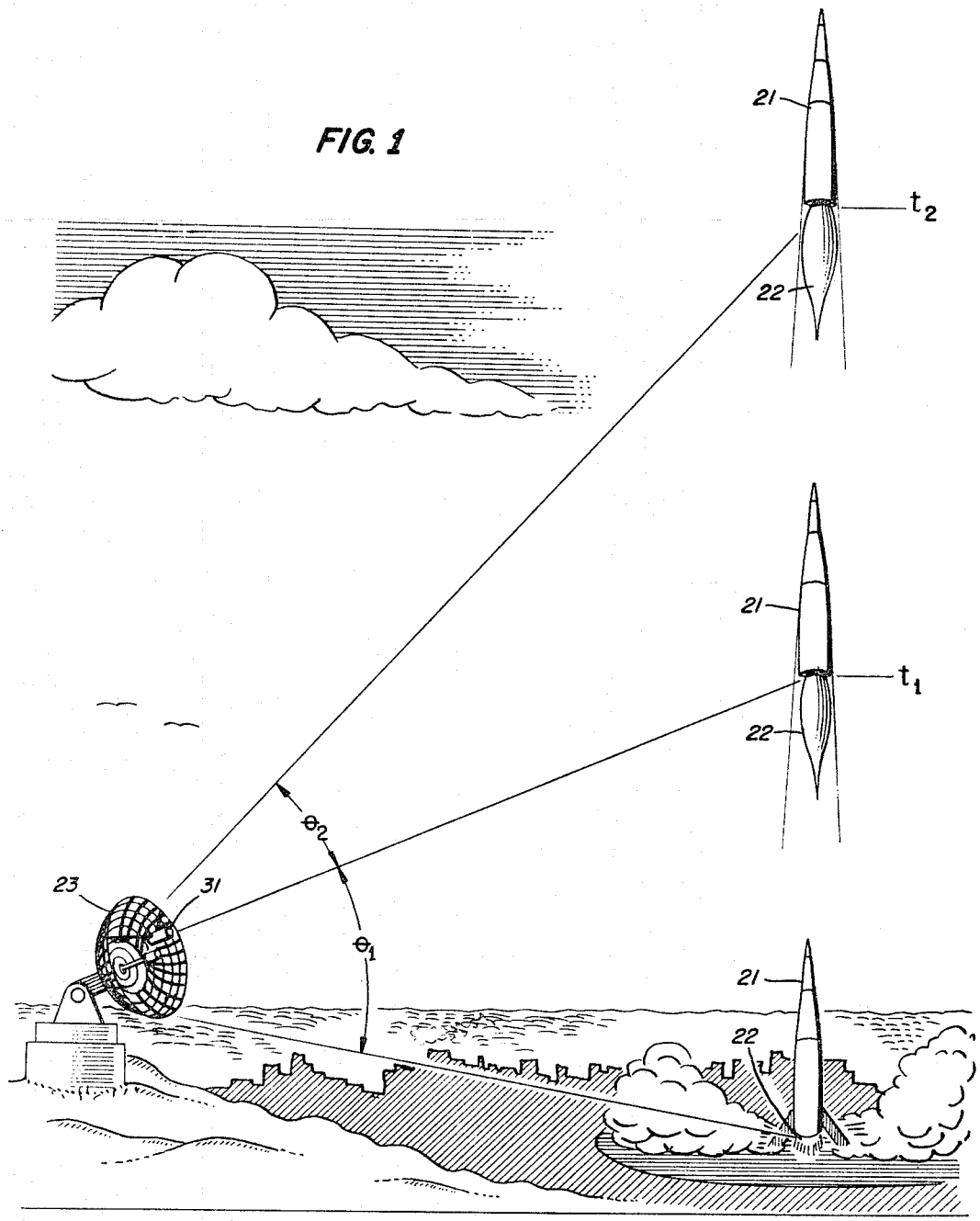
FIG. 1 is illustrative of the elevational angular changes through which a tracking antenna moves in the early phases of a missile launching.

Referring now to the drawings, wherein like reference characters designate like or corresponding parts throughout the several views, there is shown in FIG. 1 a missile 21 on the launching pad with the plume 22 emerging from the engines, and the missile at times $t_1$ and $t_2$, both shortly after blastoff. Tracing the missile is an antenna 23 of a tracking unit (not shown) with infra-red tracking head 31 mounted on the feed horn of the antenna 23 and aligned with the electrical axis thereof.

In order that the tracker follow the flight of the missile, it is necessary that the antenna move through the angle $\theta_1$ in time $t_1$ and through $\theta_2$ in time $t_2$. Assuming that the missile's distance traveled in time $t_1$ and time $t_2$ is equal or approximately so, the antenna must move through a much greater angle, $\theta_1$, in the first time unit $t_1$ than that angle, $\theta_2$, through which the antenna must move in an equal time period $t_2$. As the missile moves further away from the point of launch and the tracking antenna, the angle of movement of the antenna per actual distance traveled by the missile becomes progressively smaller. Thus, it is seen that a tracking antenna in close proximity to the object being tracked must move at an extremely rapid rate in the initial moments of tracking.

An additional factor that makes tracking of the missile shortly after blastoff very difficult is the effect of ground clutter. Ground clutter is the interference that a radar set will pick up when operating in the horizontal plane or in a plane close to the horizontal due to echoes received from objects on the horizon such as trees and buildings.

Figure 4:
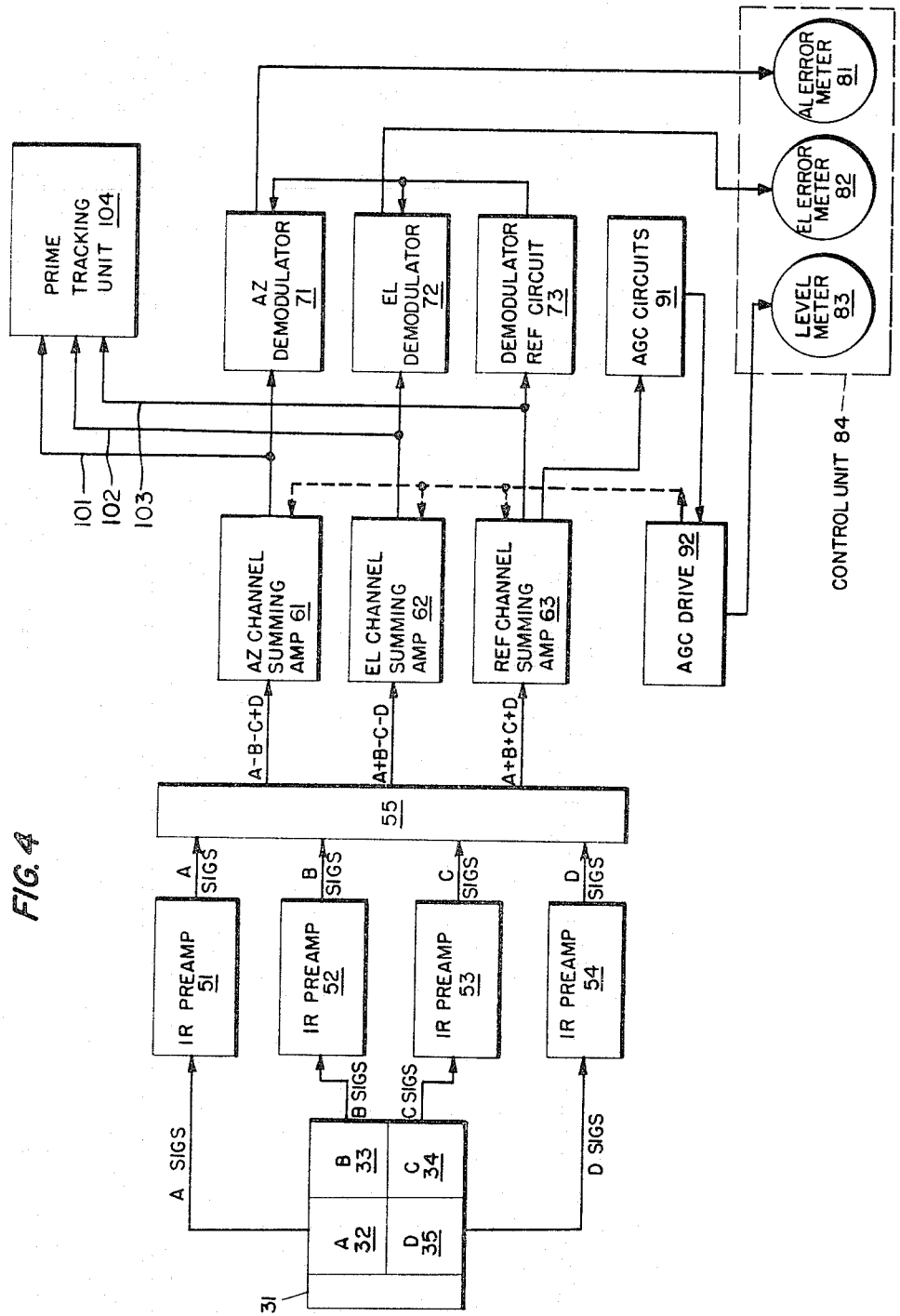
FIG. 4 is a functional block diagram of the embodiment shown in FIG. 2 of the present invention.

The infra-red sensing head 31, shown diagrammatically in FIG. 4, comprises four lead sulphide cells 32 to 35 in a quadrature arrangement to which a direct current is applied. Infra-red radiation from the plume 22 of the missile 21 appears as a modulated wave, modulation caused by fluctuations in the burning rate of the fuel. These fluctuations are sensed by the cells, causing their resistance to change thereby varying the D.C. current applied to the cells which in turn affects a modulated output therefrom.

Tracking head 31, referring to FIG. 2, has a tubular shaped configuration consisting of three main elements: a forward shield 36, a main housing member 37, and a rear cover portion 38. The shield is a hollow cylinder with an opened forward end and having a threaded portion 39 adjacent the open rearward end which is adapted to mate with a threaded portion 41 adjacent the open forward end of the main housing member 37. The rear end 42 of housing 37 is closed. To the immediate rear of the union of shield 36 and housing 37, an optical filter 43 is mounted to the housing with suitable mounting means. Centered upon the rear facing surface of the filter is a deposit of reflecting material 44 such as silver which may have a diameter approximately one-half that of the filter itself. A primary reflecting and focusing unit or mirror 45 is mounted on the rear end 42 of the housing and of slightly less diameter than the housing itself and having a centrally located square aperture therein. The reflecting surface of mirror 45 is concave. Detector cells 32 to 35 are centrally mounted upon rear wall 42 in such a manner that they are visible through the square aperture in the mirror. There is a discrete space between the reflector 45 and cells 32 to 35 to accommodate a shutter mechanism 46 therebetween. Shutter 46 is driven by a solenoid 47 which is mounted on the rear face of end 42. The solenoid is driven in turn by a signal from solenoid drive circuitry 48 also mounted on the rear wall. The drive circuitry is operatively connected to a photoelectric detector 49 which is placed in the rear of a light pipe 51 mounted atop the head 31 and which runs the entire length of shield 36 and a short distance along housing 37. The rear cover 38 is secured to the rear wall 42 of housing 37 and serves to protect the elements mounted on that face of the wall. There is sufficient room within the cover to accommodate preamplifiers 51 to 54 (shown in FIG. 4), the operation of which is explained hereinbelow.

Referencing FIGS. 2 and 3, as radiation enters the shield 36, it passes through the filter 43. Assuming the filter to be made of germanium, only a band of radiation of 2.4 to 2.8 microns will be passed. This radiation will be reflected off of primary mirror 45 and focused upon the mirrored deposit 44 on the filter. This secondary mirror 44 will reflect the radiation onto the lead detector cells 32 to 35.

The pattern of radiation impinging upon the cells will determine the magnitude and sense of error signals sent to the primary tracking system as disclosed hereinafter.

If an excessively strong source of radiation, such as the sun, is in the path of the tracker, radiation will be transmitted through the light pipe 50, to the photoelectric detector 49, and upon reaching a certain magnitude the solenoid drive 48 will operate the solenoid 47 to position the shutter 46 in front of the normal radiation path of the detectors 32 to 35 to block radiation from them, thereby preventing a damage to the detectors from the high radiation source. In one embodiment, any excessive radiation within six degrees of the axis of the tracker 31 will activate the shutter. The solenoid drive circuits may also be activated from the control panel or from a predetermined signal from the prime tracker. When a skin tracking signal is received indicating that such tracking is adequate, this predetermined signal eliminates further use of the IR system.

The output of cells 32 to 35 is amplified to four identical preamplifier circuits 51 to 54, FIG. 4, and thereafter applied to the input circuitry 55. The input circuits are connected to three channels; the azimuth, elevation, and reference channels. The azimuth and elevation channels are identical consisting of summing amplifiers 61 and 62, demodulators 71 and 72 and error meters 81 and 82; the latter appear on the control unit panel 84.

The reference channel has a summing amplifier 63 and demodulator 73, but differing slightly from the elevation and azimuth channels in that a signal path is established from the amplifier 63 to automatic gain control circuits (AGC) 91 and an AGC drive circuit 92. The output of the AGC drive is applied to a meter 83 on the control panel 84, and to the summing amplifiers 61 to 63. The output of the demodulator 73 is applied to demodulators 71 and 72. Leads 101 to 103 from the summing amplifiers 61 to 63 respectively, are connected to amplifiers in the prime tracker 104.

When the tracking head 31 is directly on target, equal radiation falls on each cell 32 to 35. The modulated signals obtained therefrom are amplified in preamplifiers 51 to 54 and thereafter applied to input circuits 55. The input circuits function to apply positive A and D signals and negative B and C signals to the azimuth channel summer 61, positive A and B signals and negative C and D signals to the elevation channel, and positive A, B, C and D signals to the reference channel.

When the tracking head is not focused directly on the missile plume, referring to FIG. 5, which shows an azimuth angle displacement, the signals are not of equal magnitude. FIGURE 5 indicates that the radiation impinges on the cells off-center, slightly towards the A–D side of the sensor 31. Therefore, the A and D signals relative to the B and C signals, as shown in FIG. 4, are of greater magnitude, and the sum of A and D minus the sum of B and C is in phase with the reference voltage signal A+B+C+D produced in the reference channel summer 63 which is applied to the azimuth channel summer 61 and of a magnitude resulting in a positive error voltage, indicative of the relative position of missile and tracker. FIGS. 6a and 6b show the modulation displaced in elevation. Similar to the operation described above, a negative error signal is produced by elevation summer 62 that is out of phase with the reference, and of a magnitude indicative of the tracking error.

Error signals indicative of azimuth and elevation tracking errors, and reference signals are applied to the control circuitry (not shown) in the primary tracking apparatus over the leads 101 to 103 thereby forcing the control circuits to move the antenna along the path of flight.

The signals from the summing amplifiers 61 to 63 are demodulated in demodulator circuits 71 to 73 and the elevation and azimuth demodulator signals are compared to the demodulated signal from the reference signal demodulator 73. The compared demodulated signals from 71 and 72 appear on meters 81 and 82 of control panel 84.

A sample of the signal from the reference channel summing amplifier 63 is monitored by AGC circuit 91 which provides a signal driving the AGC drive circuitry 92. The output of the drive circuitry appears on meter 83 of panel 84, indicative of the level of the received signal from the missile plume. This drive circuitry 92 is also used to adjust the bias level of summing amplifiers 61 to 63.

Initially, the antenna may be positioned to point at the launch pad by manual means such as by turning handwheels, or by utilizing the IR system. A target simulator that is a radiation emitting device may be used, or the plume from the missile itself may align the antenna.

Thus, an infra-red tracking aid has been fully disclosed which enables a primary tracking system to follow the movement of a missile in the early moments of launch when ground clutter interference and rapid antenna positional changes impede the primary tracking system used alone from proper operation.

Obviously many modifications and variations of the present invention are posible in the light of the above teachings. It is therefore to be understood that within the scope of the appended claims the invention may be practiced otherwise than as specifically described.

What is claimed is:

1. A method of improving the acquisition capabilities of a missile tracking system comprising the steps of
   sensing radiation emanating from the engines of a missile with an infrared sensitive device located upon the electrical axis of the antenna of a tracking system;
   obtaining signals indicative of energization of the individual quadrants of the infrared sensitive device;
   computing the relative positions of the antenna and the missile from signals produced by the infrared tracking device;
   computing an azimuth angle displacement error signal by adding together certain ones of the quadrant signals;
   computing an elevation angle displacement error signal by adding together certain other ones of the quadrant signals;
   applying the azimuth and elevation error signals to control circuitry within the tracking system whereby the antenna moves in a manner such that the missile path is followed thereby;
   computing a reference signal indicative of the level of radiation sensed by the infrared device by adding together still other ones of the quadrant signals; and
   deenergizing the infrared sensitive device upon receipt of reliable signals from some other tracking means forming a portion of the system.

2. The method of claim 1 further including the step of:
   placing a shutter in front of the infrared sensitive device to protect it from damage from a source of extremely high radiation.

3. The method of claim 1 further including the step of:
   distinguishing from the radiation emanating from said missile and other sources of radiation.

(References on following page)

References Cited by the Examiner

UNITED STATES PATENTS

| | | | |
|---|---|---|---|
| 3,020,406 | 2/1962 | Whitney | 250—83.3 |
| 3,025,515 | 3/1962 | Fairbanks | 250—83.3 X |
| 3,108,270 | 10/1963 | Fairbanks | 343—61 |
| 3,133,188 | 5/1964 | Satyendra | 250—83.3 X |
| 3,177,362 | 4/1965 | Kutzscher et al. | 250—83.3 |
| 3,261,014 | 7/1966 | Diaz | 343—61 |

ARCHIE R. BORCHELT, *Primary Examiner.*